US00RE37471B1

(19) United States

(12) Reissued Patent

Jagger

(10) Patent Number: US RE37,471 E

(45) **Date of Reissued Patent: *Dec. 18, 2001**

(54) VIAL FILLING APPARATUS

(75) Inventor: Theodore W. Jagger, White Bear Lake, MN (US)

(73) Assignee: Robert Bosch Packaging Technology, Inc., Brooklyn Park, MN (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/414,913

(22) Filed: Oct. 7, 1999

Related U.S. Patent Documents

Reissue of:

(64) Patent No.: 5,673,535
Issued: Oct. 7, 1997
Appl. No.: 08/777,992
Filed: Jan. 2, 1997

(63) Continuation of application No. 08/205,041, filed on Mar. 2, 1994, now abandoned.

(51) Int. Cl.[7] ..... B65B 3/28; B65B 3/32

(52) U.S. Cl. ..... 53/282; 53/167; 53/284.5; 53/284.6; 198/803.14

(58) Field of Search ..... 53/167, 282, 284.5, 53/284.6, 425, 426

(56) References Cited

U.S. PATENT DOCUMENTS

| | | | |
|---|---|---|---|
| Re. 30,742 | 9/1981 | Weier . | |
| 1,017,038 | 2/1912 | Champ . | |
| 1,565,371 | * 12/1925 | Kendall | 198/803.14 |

(List continued on next page.)

FOREIGN PATENT DOCUMENTS

| | | |
|---|---|---|
| 0 317 169 A1 | 5/1989 | (EP) . |
| 0 339 756 A3 | 11/1989 | (EP) . |
| 0 405 402 A2 | 1/1991 | (EP) . |
| 0 405 402 A3 | 1/1991 | (EP) . |
| 0 479 010 A1 | 4/1992 | (EP) . |
| 63-44401 | 2/1988 | (JP) . |
| 4-16411 | 1/1992 | (JP) . |

OTHER PUBLICATIONS

Presentation for: Barrier Isolation Technology Conference 1992, Despatch Industries; TL Systems Corporation, 87 pages, Aug. 1992.

Bosch Verpackungstechnik Brochure, "AKASEPTIC: Compact installation with integral clean room for ampoules and vials" pp. 1–8 (Date Unknown).

*Primary Examiner*—John Sipos

(74) *Attorney, Agent, or Firm*—Merchant & Gould P.C.

(57) ABSTRACT

Apparatus for filling sterile containers is disclosed which defines an elongated but narrow sterile zone in which a number of operating stations are disposed. An elongated vertical wall is carried by an elongated frame and a cabinet type enclosure cooperates with the vertical wall to define the sterile zone. The plurality of operating stations are disposed in sequential relation over the length of the sterile zone, and an elongated container conveyor is disposed within the sterile zone to convey the containers through the plurality of operating stations. The conveyor is vertically oriented, consisting an endless belt mounted on end wheels that rotate on horizontal axes. Each of the operating stations includes an operating portion disposed within the sterile zone. Actuating means are included for each of the operating stations as well as the elongated conveyor, each of which is disposed outside the sterile zone. Connecting means operably connect each of the actuating means outside the sterile zone through the vertical wall to the associated operating station within the sterile zone. By orienting the conveyor vertically and disposing the various actuating means outside the sterile zone in side-by-side relation, the effective width of the sterile zone is significantly reduced. As a result, the sterile zone is more easily accessed, and also more easily drained after washdown operations. In addition, the sterile zone of reduced size results in an apparatus that much easier to manufacture and maintain in a sterile state.

88 Claims, 8 Drawing Sheets

U.S. PATENT DOCUMENTS

| | | | | |
|---|---|---|---|---|
| 1,770,379 | | 7/1930 | Young . | |
| 1,813,021 | | 7/1931 | Brown . | |
| 1,920,539 | | 8/1933 | White . | |
| 2,154,266 | | 4/1939 | Ford . | |
| 2,517,569 | | 8/1950 | Huzenlaub . | |
| 2,575,863 | | 11/1951 | Clifcorn . | |
| 2,618,425 | | 11/1952 | Stover . | |
| 2,685,520 | | 8/1954 | Martin . | |
| 2,855,314 | | 10/1958 | Martin . | |
| 2,870,024 | | 1/1959 | Martin . | |
| 3,035,886 | | 5/1962 | Hickey . | |
| 3,105,335 | | 10/1963 | Hickey . | |
| 3,202,187 | | 8/1965 | Pechmann . | |
| 3,285,297 | | 11/1966 | Duft et al. . | |
| 3,336,722 | | 8/1967 | van der Winden . | |
| 3,356,510 | | 12/1967 | Barnby . | |
| 3,527,017 | | 9/1970 | Taylor et al. . | |
| 3,568,851 | | 3/1971 | Schafer . | |
| 3,579,950 | | 5/1971 | Davis . | |
| 3,619,975 | | 11/1971 | Johnson et al. . | |
| 3,694,997 | | 10/1972 | Christine et al. . | |
| 3,761,224 | | 9/1973 | Ernst . | |
| 3,766,709 | | 10/1973 | Zausner . | |
| 3,783,581 | | 1/1974 | Pierce . | |
| 3,807,467 | * | 4/1974 | Tascher | 53/282 |
| 3,820,300 | | 6/1974 | Reinecke et al. . | |
| 3,899,862 | | 8/1975 | Muys et al. . | |
| 3,940,909 | | 3/1976 | Cioni et al. . | |
| 3,942,299 | | 3/1976 | Bory . | |
| 4,014,158 | | 3/1977 | Rausing . | |
| 4,027,456 | | 6/1977 | Wilson . | |
| 4,045,945 | | 9/1977 | Möller et al. . | |
| 4,056,921 | | 11/1977 | Gilliand et al. . | |
| 4,059,903 | | 11/1977 | Piet et al. . | |
| 4,108,509 | | 8/1978 | Piet et al. . | |
| 4,118,914 | * | 10/1978 | Shields | 53/282 |
| 4,200,183 | | 4/1980 | Riggs . | |
| 4,208,852 | | 6/1980 | Pioch . | |
| 4,263,837 | | 4/1981 | Tassie . | |
| 4,296,068 | | 10/1981 | Hoshino . | |
| 4,327,826 | | 5/1982 | Wilson . | |
| 4,417,607 | | 11/1983 | Scholle et al. . | |
| 4,475,645 | | 10/1984 | Young . | |
| 4,530,202 | | 7/1985 | Powell et al. . | |
| 4,549,662 | | 10/1985 | Schoenig, Jr. et al. . | |
| 4,566,293 | | 1/1986 | Arner et al. . | |
| 4,587,793 | | 5/1986 | Brennan et al. . | |
| 4,633,645 | * | 1/1987 | Joo | 53/282 |
| 4,676,144 | | 6/1987 | Smith, III . | |
| 4,693,052 | | 9/1987 | Rebman et al. . | |
| 4,729,206 | | 3/1988 | Francis et al. . | |
| 4,761,936 | | 8/1988 | Suzuki et al. . | |
| 4,797,255 | | 1/1989 | Hatanaka et al. . | |
| 4,803,055 | | 2/1989 | Ueda . | |
| 4,860,520 | | 8/1989 | Dugan . | |
| 4,869,156 | | 9/1989 | Hutton . | |
| 4,969,915 | | 11/1990 | Hatanaka et al. . | |
| 4,979,347 | | 12/1990 | Shibauchi et al. . | |
| 5,022,165 | | 6/1991 | Beswick . | |
| 5,025,716 | | 6/1991 | Inagaki . | |
| 5,053,196 | | 10/1991 | Ide et al. . | |
| 5,129,212 | | 7/1992 | Duffey et al. . | |
| 5,152,968 | | 10/1992 | Foti et al. . | |
| 5,159,799 | | 11/1992 | Rising et al. . | |
| 5,258,162 | | 11/1993 | Andersson et al. . | |
| 5,316,733 | | 5/1994 | Rune et al. . | |
| 5,377,475 | | 1/1995 | Haarer et al. . | |
| 5,406,772 | | 4/1995 | Dinius . | |
| 5,534,222 | | 7/1996 | Kelbrick et al. . | |
| 5,881,535 | | 3/1999 | Gliniecki et al. . | |

* cited by examiner

41

VIAL FILLING APPARATUS

Matter enclosed in heavy brackets [ ] appears in the original patent but forms no part of this reissue specification; matter printed in italics indicates the additions made by reissue.

This is a Continuation of application Ser. No. 08/205,041, filed Mar. 2, 1994, and now abandoned.

BACKGROUND OF THE INVENTION

The invention broadly relates to container filling apparatus and is specifically directed to an improved apparatus for rapidly filling containers in a sterile environment.

Many pharmaceutical preparations produced by the pharmaceutical industry are dispensed in relatively small containers. Among these are injectable drugs and medicines which, by the nature of their use must be dispensed with a high level of sterility assurance. Elaborate techniques and apparatus are employed to maintain this high level of sterility.

To limit contamination, current container filling apparatus, which tends to be quite large, is placed in a clean room environment with the apparatus operators required to wear sterile attire, including gowns, gloves, headwear, masks and the like. The clean room itself must be maintained in a low contamination level, with conventional precautions taken as the operating personnel enter, observe and make adjustments to the equipment and leave. The apparatus itself must be periodically sterilized by steam cleaning and/or washed down with decontaminating liquid cleaners. It is difficult, time consuming and expensive to maintain the container filling apparatus and the clean room in a low level contamination.

This is particularly true with respect to the filling apparatus itself. A typical filling machine includes a number of operating stations; e.g., a container accumulator that dispenses empty (usually pre-sterilized) containers onto a lengthy container conveyor in sequential order through the use of a container transfer mechanism, a pre-fill check weigh station, a filling station which consists of a series of dispensing nozzles each of which is connected to a precision metering pump with associated control apparatus, a post-fill check weigh station, a stoppering or plugging mechanism (if required for the particular container configuration) including appropriate stopper feeder apparatus, and an eject and outfeed station that transfers the filled and sealed containers to an outfeed conveying system. Each component of the container package must be maintained in a sterile state throughout each of these operations. Conversely, the contamination of any single component may cause the finished package to become contaminated and unusable.

The primary source of contamination in a clean room environment is from individuals within the room who operate and/or monitor the filling apparatus. The air inside the room is brought in at a high rate thorough special filters that remove virtually all of the contaminants. Any liquids brought into the room such as cleaners or the drug product itself are filtered through high quality filters that again remove virtually all of the contaminants. Contamination is considered to be anything foreign to the drug product itself. This includes not only living microorganisms that are removed through filtration, steam sterilization, chemical sterilants, or other techniques, but also any particle matter that may enter the product container, including particles that carry no living organisms. An example of sources for organism free or "sterile" particles are particles of matter that enter the air when two sterile containers or two sterile machine parts rub together.

Equipment operators or other people that may enter the sterile environment contribute high levels of contaminants to the environment both in the form of microorganisms and particles. Because of this, elimination of the entry of people into the sterile zone is a significant improvement.

The subject invention is the result of an effort to produce apparatus that is less difficult as well as less costly to operate and maintain, including the ease of contamination control. Specifically, it has been found that the apparatus itself can be designed in such a way that it includes a smaller isolation or sterile zone including only those components which are directly essential to the filling and sealing process with all other components as well as equipment operators disposed outside the zone. By creating such a sterile zone and providing it with operator access ports, the need for a clean room is obviated, as is the need for the apparatus operators to be in sterile attire.

A preliminary approach to the problem was to build an isolation barrier around the upper "clean" portion of an existing filling apparatus. This resulted in a number of problems, the primary of which were inaccessibility to and extreme difficulty in cleaning and sterilizing the zone interior including the housed components, and the sealing of the components that pass from the inside to the outside of the sterilize zone.

The existing filling machine used for this preliminary approach is constructed in a manner with a large flat horizontal table top to which clean zone devices are mounted in the upward direction and to which the mechanical drive components are mounted in a downward direction from the horizontal table top. A stainless steel sheet metal cover is placed on the top side of the horizontal table top plate and serves as the division between the upper clean area and the lower mechanical space. When the concept was proposed to surround the upper clean space with an isolation barrier, several problems arose. First, the horizontal table top was relatively wide and, when surrounded by a barrier, would not allow for access to all points within the clean space with conventional techniques using glove port access. Second, since the significant amount of water and/or chemical may be used in a process to clean and/or sterilize the interior sterile zone, a simple and clean drainage system would be required. Because the conventional horizontal table top was large and flat, not allowing for good drainage, and since many mechanical devices pass through from the upper clean zone, now the sterile zone inside the isolator, to the lower mechanical space, the problems of drainage and sealing of the bottom of the sterile zone became a major problem.

In the subject invention an apparatus has been created the frame and main mounting plate of which are oriented vertically, defining sterile and non-sterile zones in side-by-side relation. Those components which are directly essential to the actual processing of the containers are disposed on one side of the plate (sterile zone) with the supporting components disposed on the opposite side (non-sterile zone). The plate, together with sterile cabinetry, encloses the essential components and defines the sterile zone. For example, the dispensing nozzles are disposed within the sterile zone, whereas the pumping devices are located within the non-sterile zone and connected to the nozzles by tubes that pass through the plate or barrier in sealed relation. The container conveyor itself, which of necessity is located in the sterile zone, also has been oriented from horizontal to vertical to significantly reduce its width. The drive means for the conveyor, however, is located in the non-sterile zone.

The result is a sterile zone that is of significantly reduced size, and an apparatus which is much more easily operated and maintained. The smaller sterile zone and the internally disposed components are easily accessed through glove ports and, since the zone is much smaller, it is easily cleaned. In addition, the absence of any mechanical devices passing through the bottom of the sterile zone enclosure allows for an extremely clean and drainable collection pan without the associated sealing problems.

DETAILED DESCRIPTION OF THE PREFERRED EMBODIMENT

Figure 1:
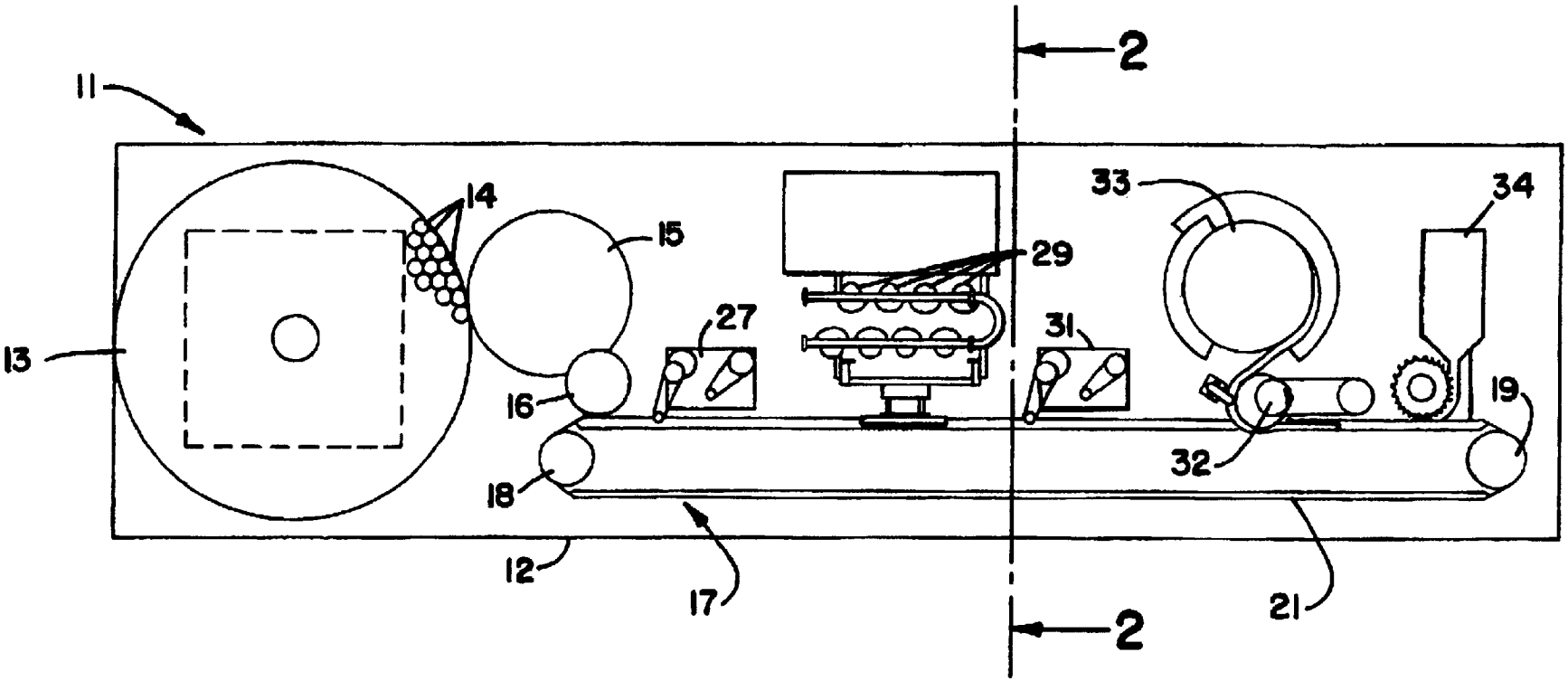
FIG. 1 PRIOR ART
FIG. 1 is a view in top plan of a prior art container filling apparatus.
Figure 2:
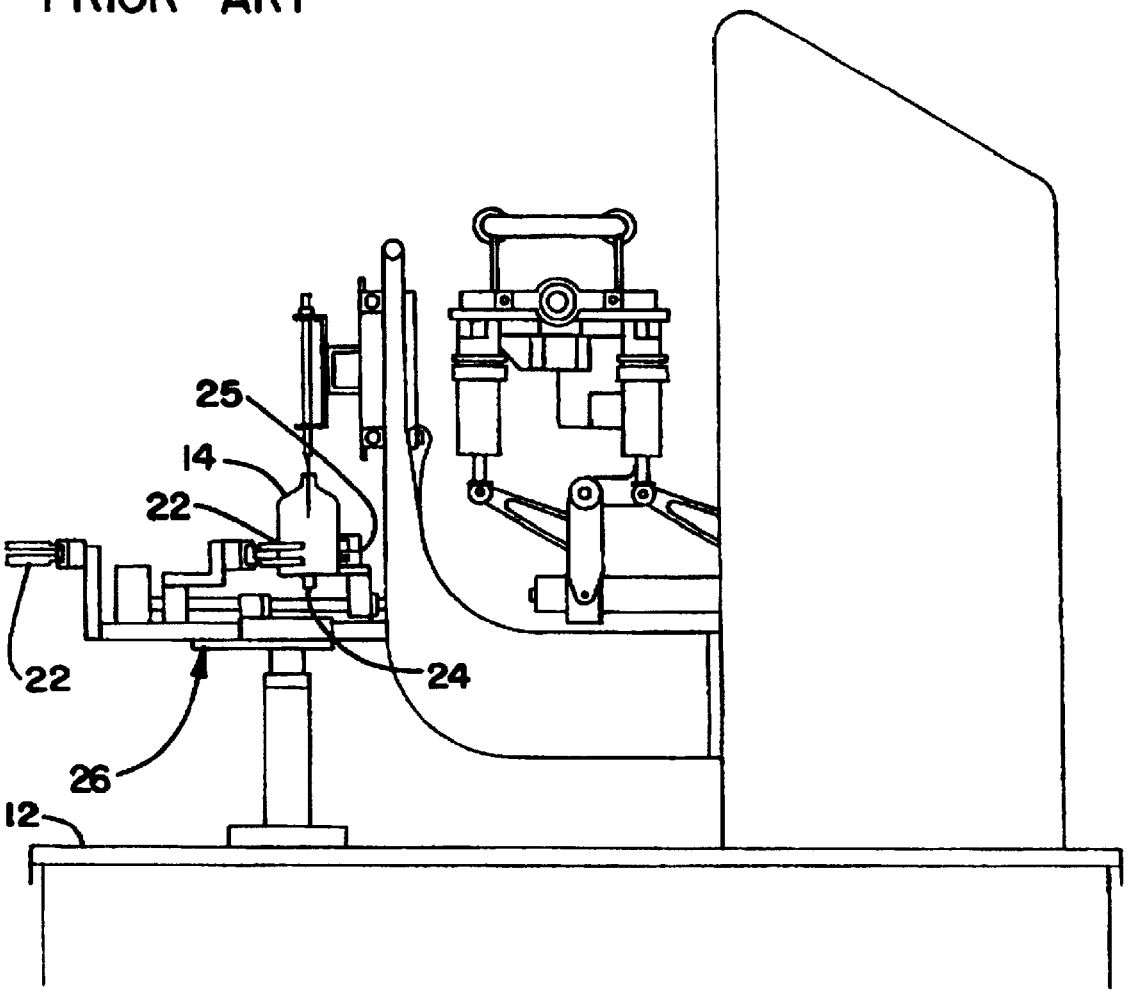
FIG. 2 PRIOR ART
FIG. 2 is a transverse sectional view of the prior art container filling apparatus taken along the line 2—2 of FIG. 1.
Figure 6:
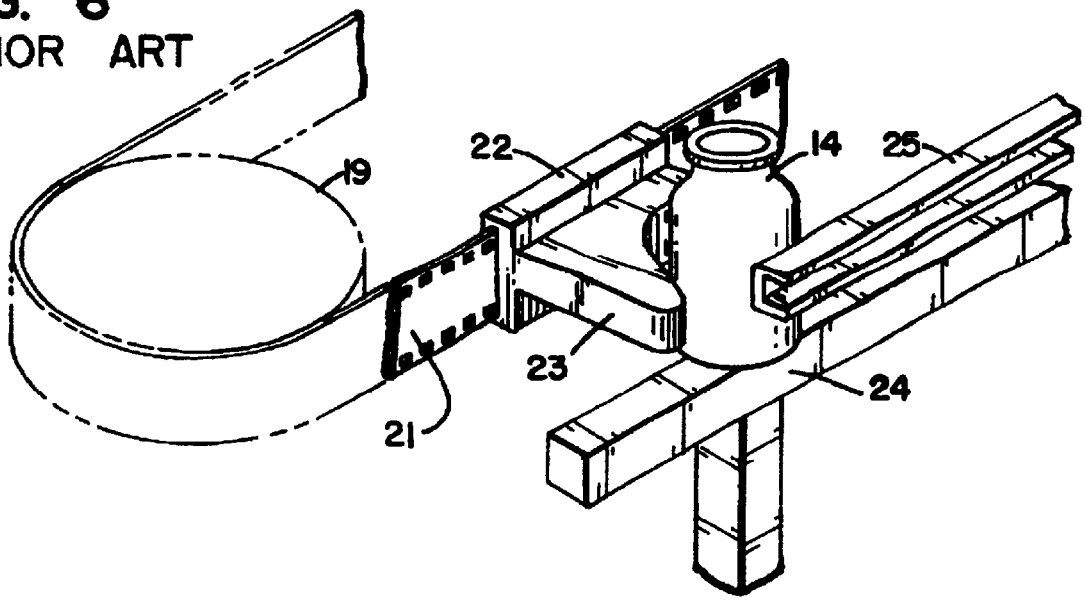
FIG. 6 PRIOR ART
FIG. 6 is a fragmentary perspective view of the prior art container conveyor.

With initial reference to FIGS. 1, 2 and 6, a typical prior art filling apparatus is represented generally by the numeral 11. Apparatus 11 comprises a large table or frame 12 that is horizontally disposed and supports all of the various components of apparatus 11. With particular reference to FIG. 1, these components include an accumulator disk 13 which is filled with a plurality of vials 14 received from a conveyor not shown. Vials 14 are transferred from accumulator disk 13 to a transfer disk 15, and a star wheel 16 individually picks up vials 14 from the transfer disk 15 and carries them to a vial conveyor 17.

With reference to FIGS. 1, 2 and 6, conveyor 17 includes drive sprockets 18, 19 at opposite ends with a sprocket type conveyor belt 21 operably connected therebetween. A plurality of cleats 22 are mounted on and carried by conveyor belt 21, each having a V-shaped frontal recess 23 that is capable of receiving and carrying vials 14 of different diameter. The sequentially carried vials 14 slide along a horizontal carrier rail 24 disposed therebelow, and a side rail 25 (FIGS. 2 and 6) retains each vial 14 within the V-shaped projection 23 and on the carrier rail 24. The position of conveyor 17 and side rail 25 may be horizontally adjusted separately by the mechanism bearing reference numeral 26 in FIG. 2, which enables the apparatus to accommodate vials of different diameter and ensures that the vials travel along the proper line of machine operation.

The vials 14 are sequentially carried by conveyor 17 to a pre-fill check weigh mechanism 27, a filling apparatus 28 consisting of a plurality of nozzles connected to a like number of pumps 29, a post-fill check weigh mechanism 31, a stoppering head 32 supplied by a stopper feeder 33, and a vial eject station 34.

Prior art vial filling apparatus 11 is open to the surrounding environment, and is conventionally disposed in a large clean room the environment of which is maintained in a decontaminated or sterile state as is known in the art. Conventional techniques are also used to prevent contamination as operating personnel enter and leave the room, including the wearing of sterile attire such as gowns, gloves, headwear and masks.

Figure 3:
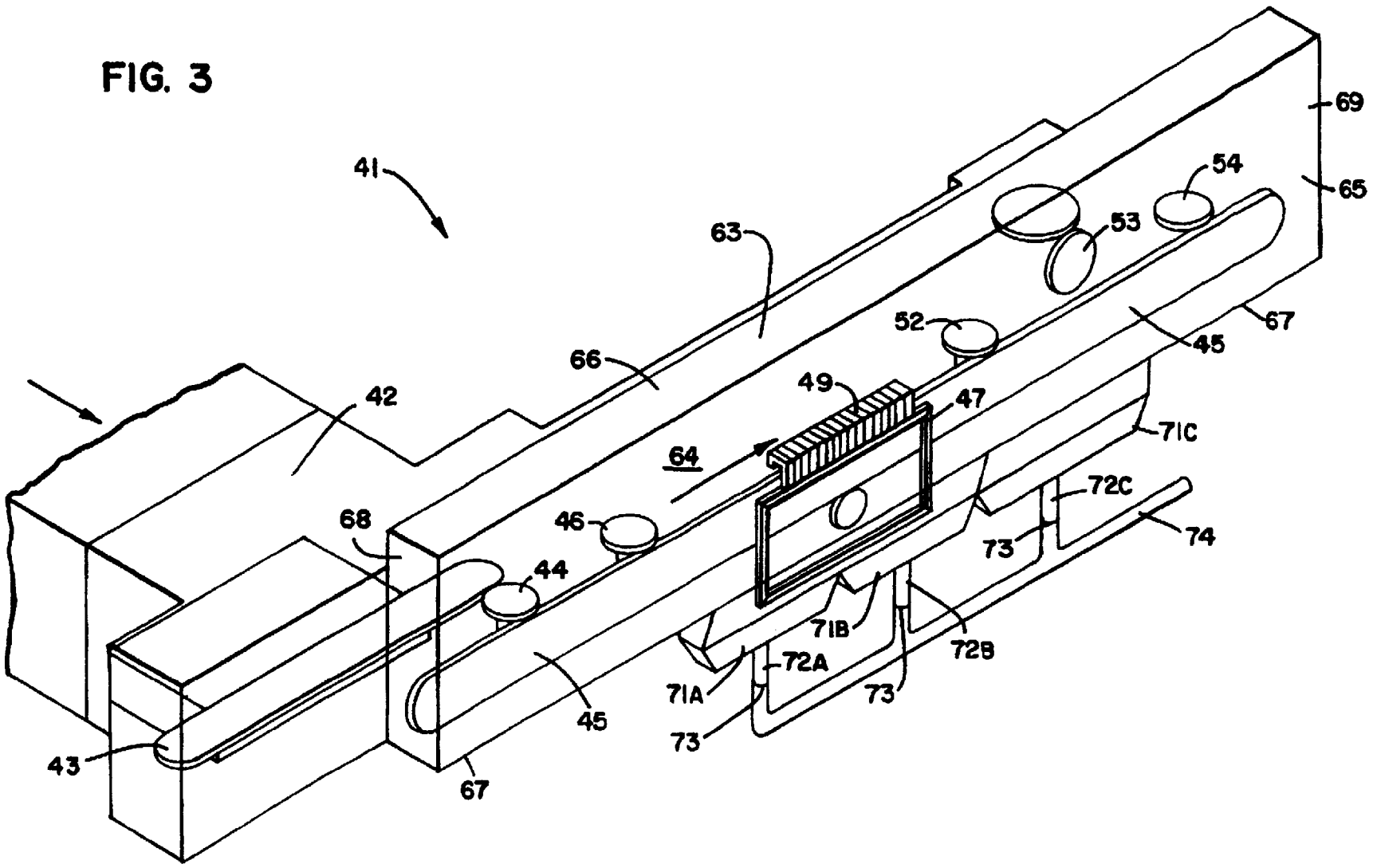
FIG. 3 is a schematic representation of a container filling apparatus embodying the invention, showing in particular a sterilization zone of reduced size.
Figure 4:
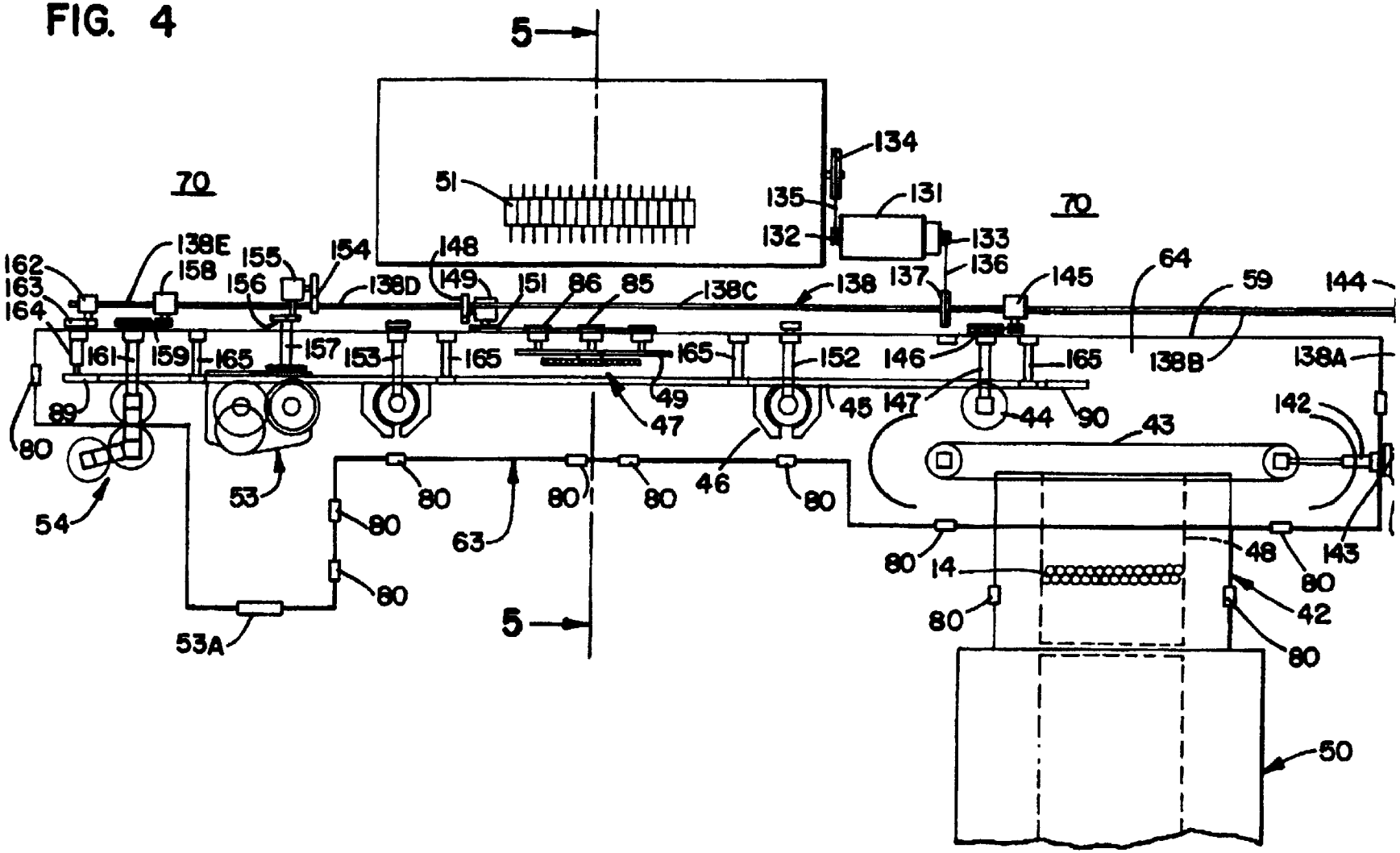
FIG. 4 is a view in top plan of the inventive container filling apparatus.
Figure 5:
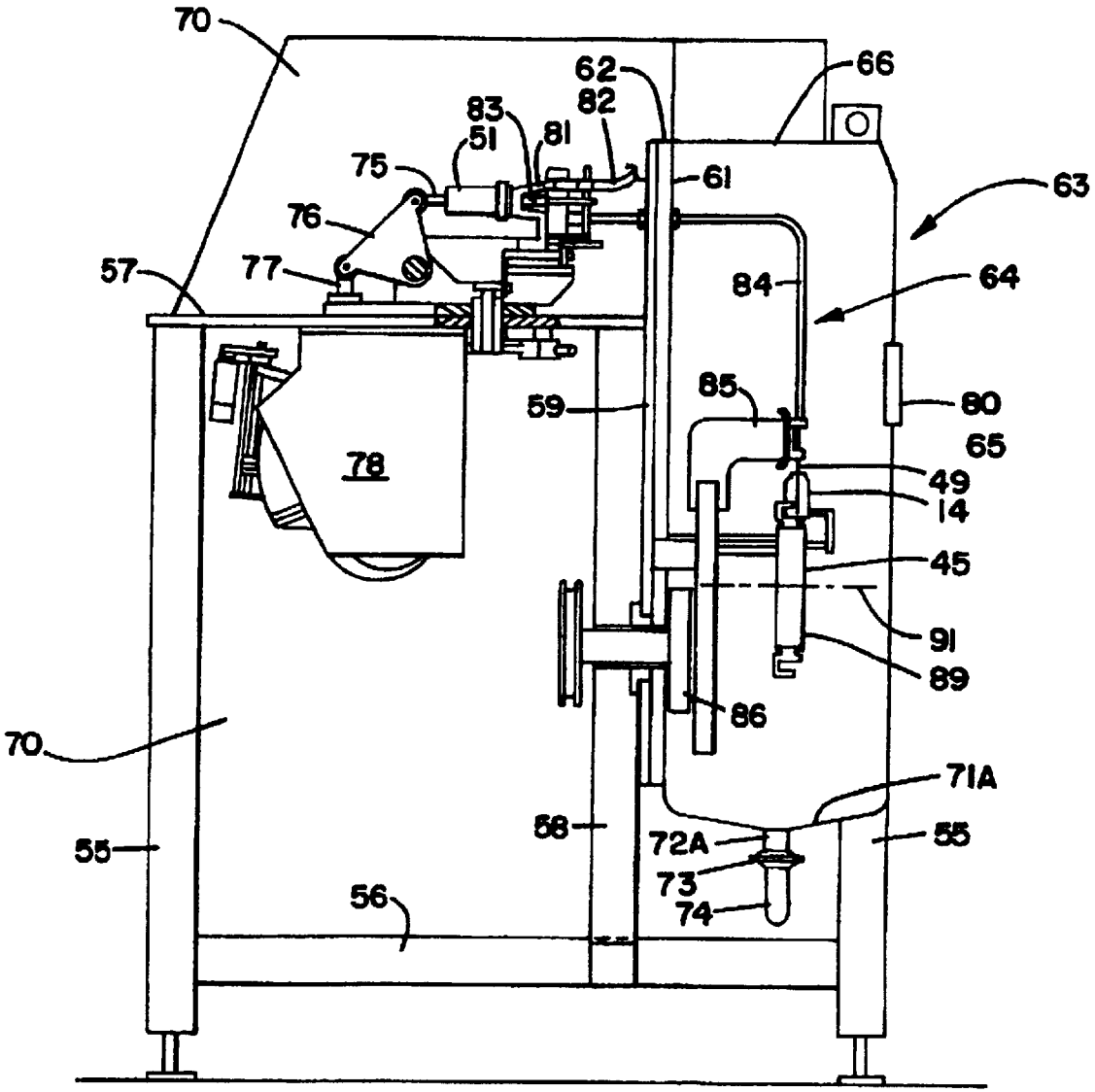
FIG. 5 is a transverse sectional view of the inventive container filling apparatus taken along the line 5—5 of FIG. 4.

With reference to FIGS. 3–5, a vial filling apparatus embodying the invention is represented generally by the numeral 41. The apparatus 41 of the preferred embodiment is intended for use in the sequential filling of continuously fed vials for injectable drugs, but the invention contemplates the filling of any type of container in a sterile environment.

With particular reference to FIG. 4, apparatus 41 includes a sterilized infeed enclosure 42 through which vials 14 pass on a conveyor 48. Infeed enclosure 42 represents the inlet to a sterile zone, discussed below, and it is essential that the vials 14 entering at this point be in a sterilized condition. To that end, enclosure 42 is connected to a conventional vial washer/sterilizing tunnel 50 that receives unsterilized vials, performs a multiple step procedure that sterilizes the vials, generally including depyrogenization, and delivers sterilized vials to the conveyor 48 of sterilized infeed enclosure 42. At this point, the sterilized vials are transferred to an oscillating belt infeed station 43 that moves the vials to a transfer star wheel 44, which sequentially loads the vials 14 onto a principal vial conveyor 45 the basic function of which is the same as conveyor 21 of the prior art apparatus 11. However, as specifically discussed below, conveyor 45 is structurally different and operates in an improved and advantageous manner.

Conveyor 45 sequentially moves the vials 14 to a pre-fill check weigh station 46 that randomly removes a vial to establish a reference pre-fill weight. The vials are then carried by conveyor 45 through a filling station 47 which comprises a plurality of nozzles 49. Nozzles 49 are supplied by a plurality of pumps 51 described in further detail below.

After filling, the vials 14 are moved by conveyor 45 past a post-fill check weigh station 52, which removes each of the randomly selected empty vials previously weighed at pre-fill check weigh station 46. This comparative weighing ensures that the specific amount of pharmaceutical preparation has been metered and dispensed into each vial.

Conveyor 45 then moves the vials through a stoppering station 53 at which each of the filled vials is closed and sealed with a stopper. Vials 14 then move into an eject and outfeed station 54, where the vials are removed from conveyor 45 and carried by means not shown to a packing station.

With reference to FIG. 5, apparatus 41 comprises an elongated frame certain components of which are shown in this transverse sectional view. These include vertical leg members 55, a vertical cross rail member 56, a mounting plate 57 and a vertical frame support member 58 that extends between the lower and upper cross rail member 56 and plate 57, at an intermediate point between the vertical leg members 55. It is will be understood that the various components 55–58 repeat over the length of the apparatus frame.

A vertically disposed mounting plate 59 is secured to the several frame support members 58, extending longitudinally over the length of the apparatus 41 (see also FIG. 4). A portion of vertical mounting plate 59 extends above the upper cross rail members 57. A thin stainless steel sheet 61 corresponding in size to vertical mounting plate 59 is mounted thereto in spaced relation, defining an air gap 62. The stainless steel sheet 61 defines the elongated barrier or back plate of a stainless steel cabinet bearing general reference numeral 63, which in turn defines an internal sterile zone 64. The area outside cabinet 63 (i.e., that portion on the left side of barrier plate 61 as viewed in FIG. 5) constitutes a non-sterile zone bearing the general reference numeral 70.

With continued reference to FIGS. 3 and 5, sterile cabinet 63 further comprises a front plate 65 that is shown as corresponding generally in size to the back plate 61 in the schematic representation of FIG. 3. However, and as shown in FIG. 4, the front plate 65 includes several outward steps to accommodate various of the components described above. A cabinet top 66 and cabinet bottom 67 interconnect the back plate 61 and front plate 65, and the cabinet ends are enclosed by end plates 68, 69.

The primary inlet to sterile zone 64 is the sterile tunnel 42 as discussed above. The stoppering station 53 also includes a stopper inlet or docking port 53*a* through which sterilized stoppers are admitted in a sterile manner as is known in the art. The sole outlet from sterile zone 64 is the eject and outfeed station 54, which in the preferred embodiment comprises a plurality of conventional star wheels, the first of which is disposed within sterile zone 64 and the second of which is disposed outside zone 70. Vials 14 are transferred between these first and second star wheels through a small opening in cabinet 63. Sterile zone 64 is preferably maintained at a pressure higher than that of the ambient surroundings to cause an outflow of air through the vial outlet between the star wheels, thus resisting contaminant entry. The means for maintaining such pressure, which is not shown, is conventional and typically includes a supply of air that is filtered to remove contaminants.

Preferably, cabinet 63 includes a plurality of conventional glove ports 80 or other conventional means for permitting sealed access to the sterile zone 64. Preferably, glove ports 80 are disposed at spaced points to permit operators of the apparatus 41 to have access at all points along the line of vial movement.

With reference to FIG. 3, a drain portion 71 of the cabinet 63 projects downwardly below the filling station 47. The respective bottom portions 67 adjacent the drain portion 71 are inclined downwardly toward the drain portion 71. The bottom of drain portion 71 defines a plurality collecting drain pans 71*a–c* which respectively lead to drains 72*a–c*. Each of the drains 72*a–c* is connected through a sealed coupling 73 to a common drain pipe 74. The purpose of these drain components is discussed in further detail below.

With reference to FIGS. 4 and 5, each of the series of pumps 51 is of the rolling diaphragm type, such as that disclosed in U.S. Pat. No. 3,880,053, and is capable of dispensing a precise amount of liquid. Each of the pumps 51 is horizontally disposed as shown in FIG. 5, and the rolling diaphragm is actuated by a reciprocating rod 75. The rod 75 is reciprocated by a pivoted linkage member 76 that is connected between the rod 75 and an actuating rod 77. The several rods 77 for the respective pumps 51 are actuated in a precisely timed manner by a controlling mechanism 78 which is known in the art.

Each of the pumps 51 has an inlet 81 to which an inlet tube 82 is connected. The several inlet tubes 82 are commonly connected to a manifold that supplies the liquid to be dispensed and filled into the vials 14.

Each of the pumps 51 has an outlet 83 from which the precise amount of liquid is dispensed or pumped. Each pump outlet 83 has an outlet tube 84 connected thereto that leads to one of the nozzles 49. The series of nozzles 49 are mounted on a walking beam 85 that linearly reciprocates in a timed sequence relative to the moving vials 14. The apparatus which controls the walking beam 85 bears general reference numeral 86 and is known in the art.

Figure 7:
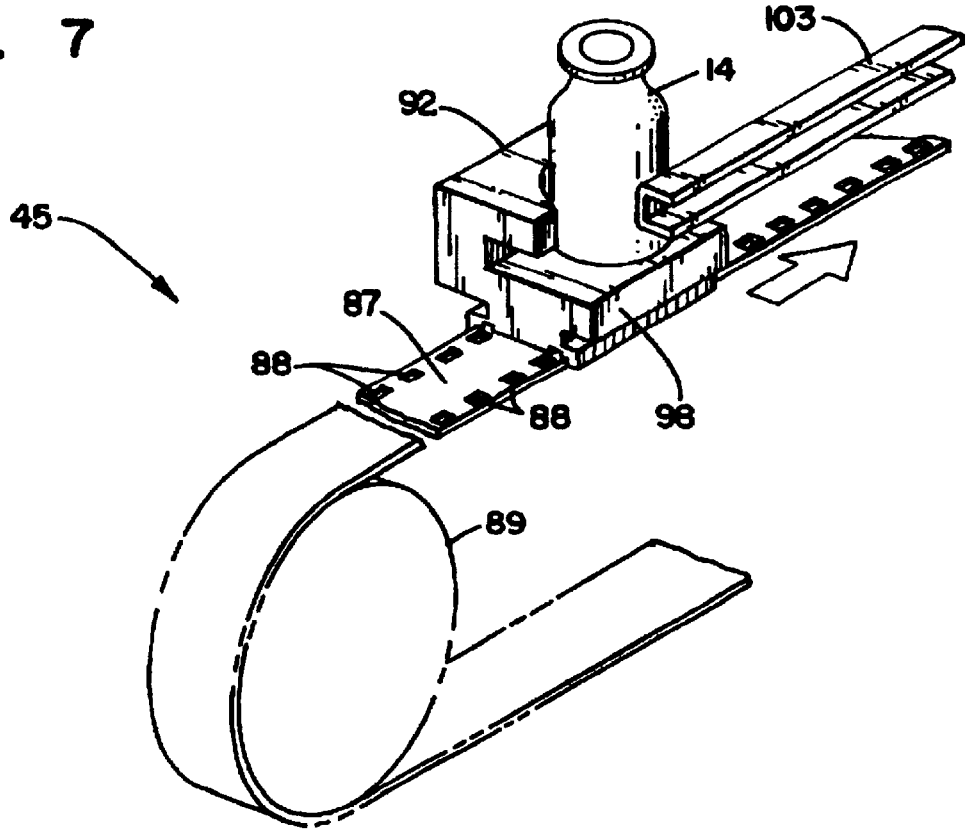
FIG. 7 is a fragmentary perspective view of a container conveyor used in the inventive container filling apparatus.

With reference to FIGS. 4, 5 and 7, conveyor 45 includes a conveyor belt 87 having a row of sprocket holes 88 disposed along each edge. Conveyor belt 87 is endlessly driven by a pair of opposed sprocket wheels 89, 90 (only sprocket wheel 89 is shown in FIG. 7). In contrast with the drive sprocket wheels 18, 19 of conveyor 17, which rotate about vertical axes, the sprocket wheels 89, 90 are turned 90 degrees and rotate about a horizontal axis as shown by reference numeral 91 in FIG. 5. For purposes of simplicity in FIG. 5, the horizontal shafts upon which drive sprocket wheels 89 rotate are not shown. Such shafts extend through appropriate seals in the stainless steel sheet 61 and mounting plate 59 and are driven as discussed below. With such a configuration, the width of conveyor 45 is significantly reduced, as compared with the prior art conveyor 17. Further, since the drive means for conveyor 45 is located outside sterile cabinet 63 as discussed below, cabinet 63 and sterile zone 64 are significantly reduced in size from the standpoint of width.

Figure 8:
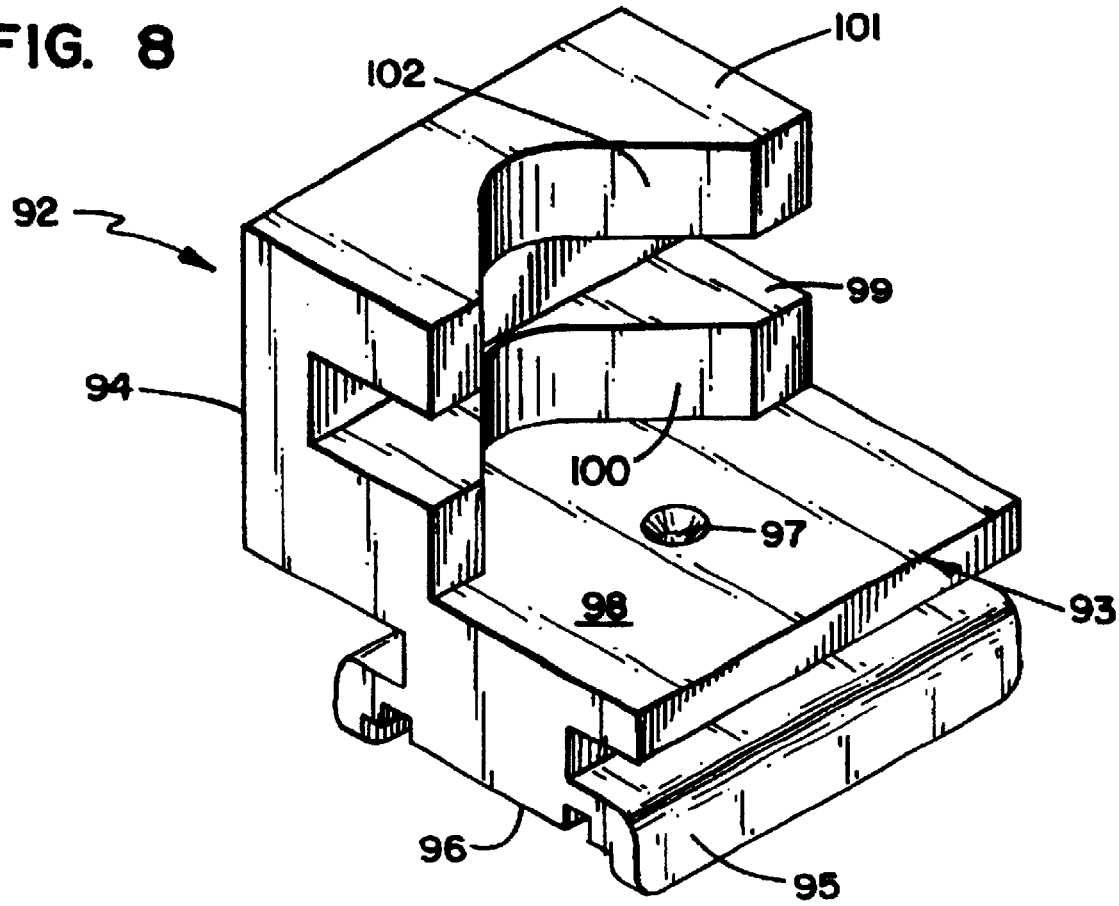
FIG. 8 is an enlarged perspective view of a conveyor cleat used on the container conveyor of FIG. 7.

With continued reference to FIGS. 7 and 8, a plurality of vial carrying cleats 92 are mounted on the conveyor belt 87, each of which has a width that substantially corresponds to the width of belt 87. With reference to FIGS. 7 and 8, each of the cleats 92 comprises a lower body 93 and an upper body 94. Lower body 93 includes a base 95 the underside of which defines a grooved track 96 that is sized and configured to overlie and be supported by conveyor belt 87. A countersunk bore 97 extends through the center of lower body 93 to receive a mounting screw (not shown) that fastens each of the cleats 92 to the conveyor belt 87. The top surface of lower body 93 defines a platform 98 on which one of the vials 14 may rest.

The upper body 94 of each of the cleats 92 is offset relative to the lower body 93 to permit a vial 14 to rest in centered relation on the lower body 93. Upper body 94 defines lower and upper lateral supports which respectively define V-shaped recesses 100, 102, respectively. The recesses 100, 102 are centered relative to the lower body 93, and in the preferred embodiment are formed at a 90 degree included angle. This angle, coupled with the size of platform 98, permits each of the cleats 92 to accept vials 14 having a range of diameters. For vials having diameters that do not fall within such range, cleats 92 of a different size or a different included angle may be substituted.

With reference to FIG. 7, conveyor 45 includes a stationary guide rail 103 that is positioned relative to the moving cleats 92 to retain the vials 14 as shown in FIG. 7. The lateral position of guide rail 103 may be adjusted, as described in further detail below, based on the diameter of the vials 14.

In comparing the prior art conveyor 17 of FIG. 6 with the improved conveyor 45 of FIG. 7, it will be appreciated that the effective operating width of conveyor 45 is significantly less than that of conveyor 17, and corresponds essentially to the width of the cleats 92 and belt 87. The prior art conveyor 17 has a width that includes not only the diameter of the drive sprocket 19 and thickness of conveyor belt 21, but twice the width of the cleats 22 as well (bearing in mind the fact that the cleats 22 project laterally from both the front and back flights of the conveyor belt 21). Further, the effective operating width of conveyor 17 is increased by the vials 14 which project laterally outward of the conveyor 17, whereas the vials 14 are carried in centered overlying relation to the conveyor belt 87. It will also be noted that the prior art conveyor 17 requires a carrier slide rail 24, which comprises additional structure, adds to the overall size of the conveyor 17 and requires the vials 14 to slide as they are moved forwardly. In the improved conveyor 45, the vials 14 rest directly and are supported in their entirety by the cleats 92, eliminating the need for the bottom slide rail 24 of the prior art and conveyor 17, avoiding friction, vibration and particle generation.

Figure 9:
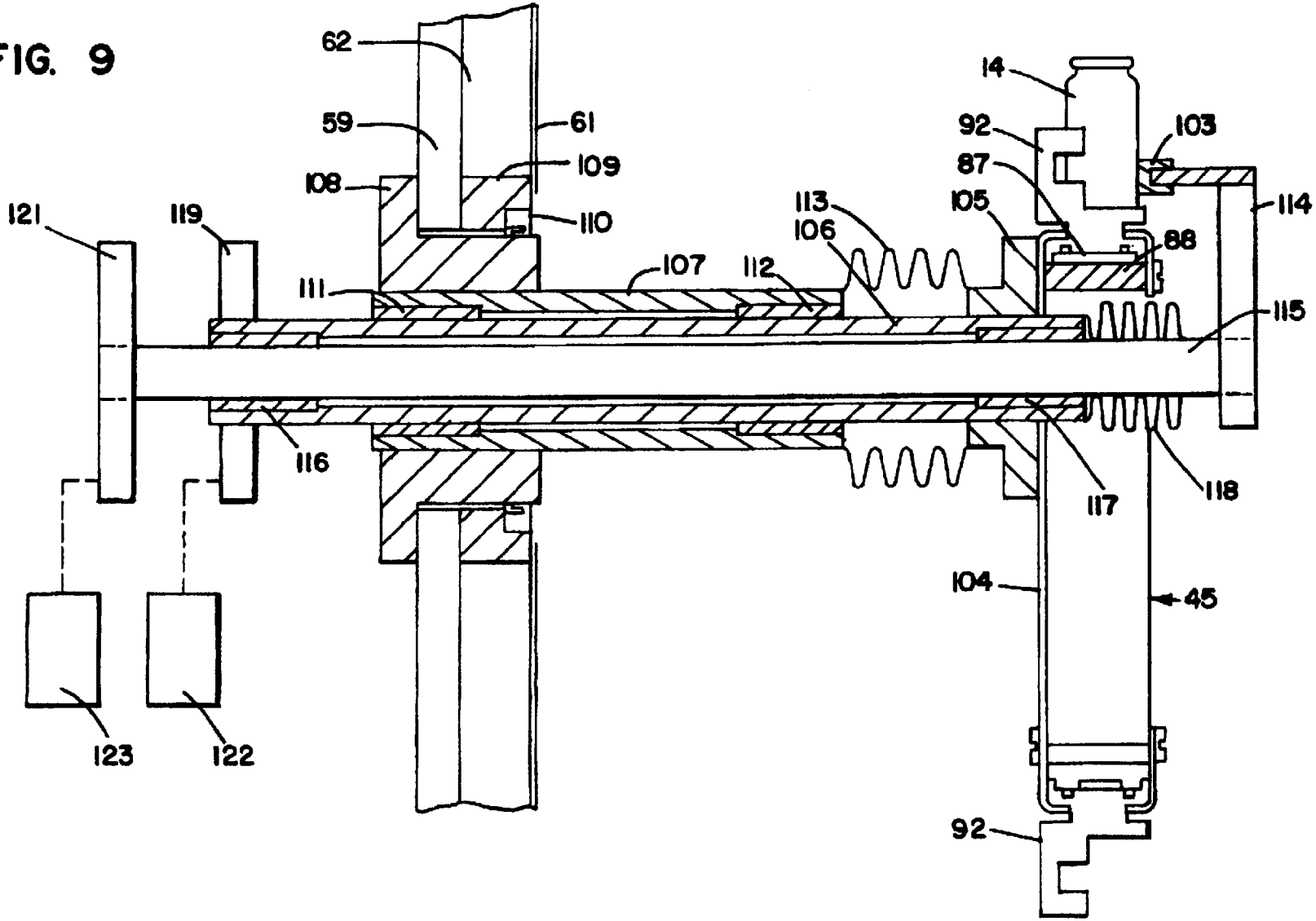
FIG. 9 is a transverse sectional view of a mechanism for adjusting the container conveyor and associated apparatus.

With reference to FIGS. 5 and 9, it is essential that the center of each of the vials 14 pass directly below the nozzles 49, and it will be appreciated that adjustments must be made to container carrying and guiding apparatuses to maintain a constant centerline of the vials. The adjustment mechanism shown in FIG. 9 permits independent adjustment of the conveyor 45 as well as the guide rail 103 to accommodate vials 14 of differing diameters and to maintain the constant centerline.

More specifically, the drive sprocket wheel 89 is carried by a mounting bracket 104 which in turn is carried by an annular mounting flange 105. Mounting flange 105 is secured to a telescoping adjustment tube 106 that projects through stainless steel sheet 61 and mounting plate 59. Telescoping adjustment tube 106 is carried for such telescopic movement by a stationary mounting tube 107 that is secured to an annular mounting collar 108. An annular ring 109 and annular seal 110 disposed in the air gap 62 in encircling relation to mounting collar 108 serve to maintain the sterile zone 64 in a decontaminated state.

Bearings 111, 112 disposed between adjustment tube 106 and mounting tube 107 permit relative telescoping movement of the tube 106, and a flexible bellows 113 extends between stationary tube 107 and mounting flange 105 to permit such relative movement while sealing against contamination.

Guide rail 103 is carried by a mounting bracket 114 that is mounted to a telescoping adjustment shaft 115. Shaft 115 telescopically slides within adjustment tube 106 relative to a pair of bearings 116, 117. A flexible bellows 118 is secured at one of its ends to the adjustment shaft 115 with the other end secured to the end of adjustment tube 106, also for the purpose of preventing the entry of contaminating matter into sterile zone 64.

A control plate 119 is mounted to the outer end of adjustment tube 106, and a similar mounting plate 121 is mounted to the outer end of adjustment shaft 115. Separate actuator means 122, 123 are respectively connected to the control plates 119, 121 to effect separate adjustment of the adjustment tube 106 and shaft 115. The actuator means 122, 123 may be interrelated for adjustment to vials of predetermined diameter, and may also include automated means to ensure centering of the vials 14 relative to the nozzles 49.

With reference to FIG. 4, each of the operating stations disposed within the sterile zone 64 is driven by an actuating means that is disposed outside the sterile zone 64 (i.e., within the nonsterile zone 70). These various actuating means, although separate, are interrelatably driven because the various operations performed within sterile zone 64 must be synchronous. An electric motor 131 serves as the primary drive means for the various actuating means. Separate servomotors are used for other actuating means as described below, which are operated in synchronous relation to primary drive motor 131. Motor 131 includes drive pulleys 132, 133 at each end. Drive pulley 132 drives a driven pulley 134 through an endless drive belt 135. Driven pulley 134 is operably connected to the bank of 16 pumps 51 in a conventional manner.

Drive pulley 133 is connected through a drive belt 136 to a driven pulley 137, which in turn is mounted to a common drive shaft bearing the general reference numeral 138. Drive shaft 138 comprises a plurality of interconnected drive shaft segments 138*a–e*.

Drive shaft segment 138*a* is connected through a right angle gear drive 139 to a pulley/timing belt configuration. A drive connection 142 extends through the wall of cabinet 63, connecting the pulley/timing belt 141 to the oscillating belt infeed station 43. The seal in the wall of cabinet 63, which bears reference numeral 143, is of the same type as the seal consisting of components 108–110 used for the lateral conveyor belt/rail adjustment of FIG. 9.

Drive shaft segment 138*a* is connected to shaft segment 138*b* through a right angle drive 144. A right angle drive 145 is connected between drive shaft segments 138*b–c*, the purpose of which is to drive the star wheel 44 through a pulley/belt configuration 146 and a drive connection 147. Drive connection 147 extends through mounting plate 59 of cabinet 63 through a seal of the same type as seal 143.

Drive shaft segment 138*c* is connected through a pulley/belt configuration 148 to a right gear drive 149 having a drive pulley 151 (see also FIG. 5). Drive pulley 151 is connected to drive the walking beam 85 through actuators 86 as described above, each of which extends through the mounting plate 59 through a seal similar to seal 143.

The pre-fill check weigh station 46 and post-fill check weigh station 52 are separately driven by servomotors (no shown for purposes of clarity), which are operated in synchronous relation to the primary drive motor 131. Pre-fill check weigh apparatus 46 includes a drive connection 152, and post-fill check weigh apparatus 52 includes a drive connection 153.

Shaft drive segment 138*d* is connected through a pulley/belt configuration 154 to a right angle gear drive 155 which in turn drives a pulley/belt configuration 156. This in turn is connected to a drive connection 157 that actuates a portion of the stoppering station 53. Other components of the stoppering station are driven by a separate variable speed motor.

Shaft drive segment 138*d* is also connected through a gear drive 158 that drives a pulley/belt configuration 159. A drive connection 161 interconnects the configuration 159 through a seal, similar to seal 143, to the eject and outfeed station 54.

Shaft drive segment 138*e* is connected to a right angle gear drive 162 which in turn drives a pulley/belt configuration 163. A drive connection 164 extends through a seal and mounting plate 59 and connects configuration 163 with drive sprocket wheel 89. Sprocket wheel 90 is a driven wheel and does not include a direct drive.

The lateral adjustment mechanism shown on FIG. 9 is included in the drive connection 164. This adjustment mechanism is provided at a plurality of points over the length of conveyor 45, each of which is represented by reference numeral 165. The actuating means for effecting lateral adjustment is not shown in FIG. 4 for purposes of clarity.

FIG. 4 particularly emphasizes the significantly improvement in filling apparatus 41 of a sterile zone that is significantly reduced in size, with only those components that are directly essential to the filling process located within the sterile zone. All other components, including machine drive elements, pumps, controls and the like are located outside the sterile zone. By effectively reducing the size of the essential components within the sterile zone and focusing on decontaminant sealing techniques, the resulting sterile zone is considerably smaller in size, shortens the operator's reach into the operating area while excluding potential contamination by the operator, and significantly reduces the periodic cleaning and sterilizing task.

In this latter regard, and with particular reference to FIGS. 3 and 5, the sterile zone 64 within the sterile cabinet 63 can be periodically cleaned and sterilized by techniques utilizing steam and/or a disinfecting liquid wash with all of the internal components in place. As a result, clean zone 64 may be effectively sterilized and decontaminated on a periodic basis in a manner which is far easier than decontaminating an entire room or much larger zone. This also results in a significant decrease in the cost of operating and maintaining the apparatus 41.

What is claimed is:

1. Apparatus for filling containers in a substantially sterile environment, comprising:

elongated frame means;

upright wall means carried by the elongated frame means and extending over a substantial portion of its length, the upright wall means dividing the apparatus into an elongated *substantially contamination free* sterile zone and an elongated non-sterile zone disposed in adjacent relation;

elongated enclosure means carried by the elongated frame means and cooperating with the upright wall means to define said elongated sterile zone;

a plurality of operating stations each including operating means disposed in substantially linear relation within said elongated sterile zone, a given operation being performed with respect to said containers at each operating station by the associated operating means;

transport means disposed within said elongated sterile zone for transporting containers through said plurality of operating stations;

said plurality of operating means comprising:

first container transfer means for transferring empty containers from a point outside said elongated sterile zone to said transport means;

*pharmaceutical* container filling means;

means for closing said filled containers; and second container transfer means for transferring filled containers from said transport means to a point outside said elongated sterile zone;

actuating means for said transport means and for each of said operating means, each of said actuating means being disposed within said non-sterile zone; and connection means for operatively connecting each of said actuating means with its associated operating means, each of said connection means extending through a sealed opening in said upright wall means.

2. The apparatus defined by claim 1, wherein the enclosure means comprises a bottom wall and drain means disposed within said bottom wall.

3. The apparatus defined by claim 1, wherein the upright wall means comprises a substantially vertical wall member.

4. The apparatus defined by claim 3, wherein said substantially vertical wall member and said enclosure means comprise stainless steel.

5. The apparatus defined by claim 1, wherein the transport means comprises:

first and second drive wheels disposed in opposed relation, each of said drive wheels being disposed for rotation about a substantially horizontal axis;

an endless conveyor belt encircling said first and second drive wheels and defining upper and lower flights; and a plurality of container carrying members secured to the endless conveyor belt in spaced relation.

6. The apparatus defined by claim 5, wherein each of the container carrying members is disposed in overlying relation to the outer face of the endless conveyor belt.

7. The apparatus defined by claim 6, wherein the width of each container carrying member substantially corresponds to the width of the endless conveyor belt.

8. The apparatus defined by claim 6, wherein each of said container carrying members defines a platform sized and configured to receive and supportably carry one of said containers.

9. The apparatus defined by claim 8, wherein each of said container carrying members further comprises a V-shaped laterally opening recess disposed over said platform for providing lateral support to containers of differing size.

10. The apparatus defined by claim 9, which further comprises an elongated guide rail disposed within said sterile zone adjacent the upper flight of said endless conveyor belt in opposed relation to said V-shaped laterally opening recess to retain said containers therein.

11. The apparatus defined by claim 10, which further comprises:

means for supporting the guide rail for laterally adjustable movement; and actuating means for adjusting the position of said guide rail relative to said upper flight.

12. The apparatus defined by claim 11, wherein said actuating means *for adjusting the position of the guide rail* is disposed in said non-sterile zone.

13. The apparatus defined by claim 5, which further comprises:

means for supporting the transport means for laterally adjustable movements; and adjustment actuating means for adjusting the lateral position of said transport means relative to said operating means.

14. The apparatus defined by claim 13, wherein said adjustment actuating means is disposed in said non-sterile zone.

15. The apparatus defined by claim 1, wherein said filling means comprises a plurality of nozzles disposed in said substantially linear relation.

16. The apparatus defined by claim 15, wherein the actuating means for said plurality of nozzles comprises a like plurality liquid pumping means, and the connecting means therefor comprises a plurality of liquid conduits interconnecting each pumping means with its associated nozzle.

17. The apparatus defined by claim 1, wherein the plurality of operating means further comprises:

pre-fill check weighing means to determine the weight of a selected container prior to filling; and post-fill check weighing means to determine the weight of said selected container after filling.

18. The apparatus defined by claim 1, wherein the first container transfer means comprises means for sterilizing said empty containers.

19. Apparatus for filling containers in a substantially sterile environment, comprising:

frame means;

upright wall means carried by the frame means and dividing the apparatus into a *substantially contamination free* sterile zone and a non-sterile zone at least partially disposed in side-by-side relation;

enclosure means carried by the frame means and cooperating with the upright wall means to define said sterile zone;

transport means at least partially disposed within said sterile zone for transporting containers [through said plurality of operation stations;] *through said sterile zone;*

*container transfer means for transferring empty containers from a point outside said sterile zone to said transport means in said sterile zone;* means for filling containers *with pharmaceuticals* as they are moved through the sterile zone by the transport means, the means for filling containers being disposed in said sterile zone;

actuating means disposed within said non-sterile zone for actuating said means for filling containers; and connection means for operably connecting the actuating means with the means for filling containers, the connection means extending through a sealed opening in said upright wall means.

20. Apparatus for filling containers in a substantially sterile environment, comprising:

frame means;

upright wall means carried by the frame means and dividing the apparatus into a *substantially contamination free* sterile zone and a non-sterile zone disposed in adjacent relation;

enclosure means carried by the frame means and cooperating with the upright wall means to define said sterile zone;

a plurality of operating stations each including operating means disposed in sequential relation within said sterile zone, a given operation being performed with respect to said containers at each operating station by the associated operating means;

transport means disposed within said sterile zone for transporting containers through said plurality of operating stations;

said plurality of operating stations comprising:

first container transfer means for transferring empty containers from a point outside said sterile zone to said transport means;

*pharmaceutical* container filling means;

means for closing said containers; and second container transfer means for transferring filled containers from said transport means to a point outside said sterile zone;

actuating means for said transport means and for each of said operating means, each of said actuating means being disposed within said non-sterile zone; and connection means for operably connecting each of said actuating means with its associated operating means, each of said connection means extending through a sealed opening in said upright wall means.

21. The apparatus defined by claim 20, wherein the plurality of operating means further comprises:

pre-fill check weighing means to determine the weight of a selected container prior to filling; and post-fill check weighing means to determine the weight of said selected container after filling.

22. The apparatus defined by claim 20, wherein the transport means comprises endless conveyor belt means defining upper and lower flights and a plurality of container carrying members secured to the endless conveyor belt means in spaced relation, the container carrying members being disposed in overlying relation to the outer face of the endless conveyor belt means.

23. The apparatus defined by claim 22, wherein the width of each container carrying member substantially corresponds to the width of the endless conveyor belt means.

24. The apparatus defined by claim 20, wherein said filling means comprises a plurality of nozzles disposed in overlying relation to said endless conveyor belt means.

25. The apparatus defined by claim 24, wherein the actuating means for said plurality of nozzles comprises a like plurality of liquid pumping means, and the connecting means therefor comprises a plurality of liquid conduits interconnecting each pumping means with its associated nozzle.

26. Apparatus for filling containers in a substantially sterile environment, comprising:

frame means;

upright wall means carried by the frame means and dividing the apparatus into a *substantially contamination free* sterile zone and a non-sterile zone at least partially disposed in side-by-side relation;

enclosure means carried by the frame means and cooperating with the upright wall means to define said sterile zone;

a plurality of operating stations each including operating means disposed in sequential relation within said sterile zone, a given operation being performed with respect to said containers at each operating station by the associated operating means;

transport means at least partially disposed within said sterile zone for transporting containers through said plurality of operating stations;

*container transfer means for transferring empty containers from a point outside said sterile zone to said transport means in said sterile zone;* said plurality of operating stations comprising:

means for filling containers *with pharmaceuticals* as they are moved through the sterile zone by the transport means; and means for placing a closure member on each container after it has been filled and as it is moved through the sterile zone by the transport means;

actuating means for each of said operating means, each of said actuating means being disposed within said non-sterile zone;

and connection means for operably connecting each of said actuating means with its associated operating means, each of said connection means extending through a sealed opening in said upright wall means.

27. Apparatus for filling containers in a substantially sterile environment, comprising:

elongated frame means;

upright wall means carried by the elongated frame means and extending over a substantial portion of its length, the upright wall means dividing the apparatus into an elongated *substantially contamination free* sterile zone and an elongated non-sterile zone disposed in adjacent relation;

elongated enclosure means carried by the elongated frame means and cooperating with the upright wall means to define [an] *the* elongated sterile zone;

a plurality of operating stations each including operating means disposed in substantially linear relation over the length of and within said elongated sterile zone, a given operation being performed with respect to said containers [by the operating means] at each operating station by the associated operating means;

transport means disposed within said elongated sterile zone for transporting containers through said plurality of operating stations;

first container transfer means for transferring empty containers from a point outside said elongated sterile zone to said transport means;

second container transfer means for transferring filled containers from said transport means to a point outside said elongated sterile zone;

said plurality of operating means comprising:

means for filling containers *with pharmaceuticals* as they are moved through the sterile zone by the transport means; and means for closing said filled containers after they have been filled as they are moved through the sterile zone by the transport means;

actuating means for said transport means and for each of said operating means, each of said actuating means being disposed within said non-sterile zone; and connection means for operatively connecting each of said actuating means with its associated operating means, each of said connection means extending through a sealed opening in said upright wall means.

28. The apparatus defined by claim 27, wherein the transport means comprises endless conveyor belt means defining upper and lower flights, and a plurality of container carrying means secured to the endless conveyor belt means in spaced relation, each container carrying means being constructed and arranged to support and convey a container and its content.

29. The apparatus defined by claim 27, wherein the first and second container transfer means are disposed within the elongated sterile zone, and further comprising actuating means for each of said first and second container transfer means, each of said actuating means being disposed within said non-sterile zone, and connection means for operatively connecting each of said actuating means with its associated container transfer means.

30. The apparatus defined by claim 27, wherein the enclosure means comprises a bottom wall and drain means disposed within said bottom wall.

31. The apparatus defined by claim 27, wherein each of said connection means extends through an opening in said upright wall means, and further comprising means for establishing a seal between each of said connection means and said upright wall means.

32. Apparatus for filling containers in a substantially sterile environment, comprising:

frame means;

upright wall means carried by the frame means and dividing the apparatus into a *substantially contamination free* sterile zone and a non-sterile zone disposed in adjacent relation;

enclosure means carried by the frame means and cooperating with the upright wall means to define said sterile zone;

a plurality of operating stations each including operating means disposed in sequential relation within said sterile zone, a given operation being performed with respect to said containers at each operating station by the associated operating means;

transport means disposed within said sterile zone for transporting containers through said plurality of operating stations;

first container transfer means for transferring empty containers from a point outside said sterile zone to said transport means;

second container transfer means for transferring filled containers from said transport means to a point outside said sterile zone;

said plurality of operating stations comprising:

means for filling containers with *pharmaceuticals* as they are moved through the sterile zone by the transport means; and means for closing said containers after they have been filled as they are moved through the sterile zone by the transport means;

actuating means for said transport means and for each of said operating means, each of said actuating means being disposed within said non-sterile zone; and connecting means for operably connecting each of said actuating means with its associated operating means, each of said connection means extending through a sealed opening in said upright wall means.

33. The apparatus defined by claim 32, wherein the transport means comprises endless conveyor belt means defining upper and lower flights, and a plurality of container carrying means secured to the endless conveyor belt means in spaced relation, the container carrying means being constructed and arranged to support and convey the container and its contents.

34. The apparatus defined by claim 32, wherein the first and second container transfer means are disposed within the elongated sterile zone, and further comprising actuating means for each of said first and second container transfer means, each of said actuating means being disposed in said non-sterile zone, and connection means for operably connecting each of said actuating means with its associated container transfer means.

35. The apparatus defined by claim 32, wherein the enclosure means comprises a bottom wall and drain means disposed within said bottom wall.

36. The apparatus defined by claim 32, wherein each of said connection means extends through an opening in said upright wall means, and further comprising means for establishing a seal between each of said connection means and said upright wall means.

37. Apparatus for filling containers in a substantially sterile environment, comprising:

frame means;

upright wall means carried by the frame means and dividing the apparatus into a *substantially contamination free* sterile zone and a non-sterile zone at least partially disposed in side-by-side relation;

enclosure means carried by the frame means and cooperating with the upright wall means to define said sterile zone;

a plurality of operating stations each including operating means disposed in sequential relation within said sterile zone, a given operation being performed with respect to said containers at each operating station by the associated operating means;

transport means at least partially disposed within said sterile zone for transporting containers through said plurality of operating stations;

*container transfer means for transferring empty containers from a point outside said sterile zone to said transport means in said sterile zone;* said plurality of operating stations comprising:

means for filling containers with *pharmaceuticals* as they are moved through the sterile zone by the transport means; and means for closing said containers after they have been filled as they are moved through the sterile zone by the transport means;

actuating means for each of said operating means, each of said actuating means being disposed within said non-sterile zone; and connection means for operably connecting each of said actuating means with its associated operating means, each of said connection means extending through a sealed opening in said upright wall means.

38. The apparatus defined by claim 37, wherein the transport means comprises:

conveyor means disposed within said sterile zone for conveying containers through said plurality of operating stations;

first container transfer means for transferring empty containers from a point outside said sterile zone to said conveyor means; and second container transfer means for transferring filled containers from said conveyor means to a point outside said sterile zone.

*39. An apparatus for filling containers in a substantially sterile environment, the apparatus comprising:*

*a frame;*

*an upright wall carried by said frame and dividing the apparatus into a substantially contamination free sterile zone and a non-sterile zone at least partially disposed in side-by-side relation;*

*an enclosure cooperating with said upright wall to define said sterile zone;*

*a transfer apparatus that receives empty containers from a point outside said sterile zone;*

*a transport at least partially disposed within said sterile zone that moves the containers through said sterile zone;*

*a filling station that fills containers with pharmaceuticals as they are moved through said sterile zone by said transport, said filling station being disposed in said sterile zone;*

*actuating apparatus in operable communication with said filling station, said actuating apparatus disposed within said non-sterile zone; and*

*connecting apparatus between said actuating apparatus and said filling station, said connecting apparatus extending through a sealed opening in said upright wall.*

*40. An apparatus for filling containers according to claim 39, wherein said enclosure comprises a bottom wall and a drain disposed within said bottom wall.*

*41. An apparatus for filling containers according to claim 39, wherein said upright wall comprises a substantially vertical wall member.*

*42. An apparatus for filling containers according to claim 41, wherein said substantially vertical wall member and said enclosure comprise stainless steel.*

*43. An apparatus for filling containers according to claim 39, wherein said transport comprises:*

*first and second drive wheels disposed in opposed relation, each of said drive wheels being disposed for rotation about a substantially horizontal axis;*

*an endless conveyor belt encircling said first and second drive wheels and defining upper and lower flights; and*

*a plurality of container carrying members secured to the endless conveyor belt in spaced relation.*

*44. An apparatus for filling containers according to claim 43, wherein each of said container carrying members is disposed in overlying relation to the outer face of the endless conveyor belt.*

*45. An apparatus for filling containers according to claim 44, wherein the width of each container carrying member substantially corresponds to the width of the endless conveyor belt.*

*46. An apparatus for filling containers according to claim 44, wherein each of said container carrying members defines a platform sized and configured to receive and supportably carry one of said containers.*

*47. An apparatus for filling containers according to claim 46, wherein each of said container carrying members further comprises a V-shaped laterally opening recess disposed over said platform for providing lateral support to containers of differing size.*

*48. An apparatus for filling containers according to claim 39, wherein said filling station comprises a plurality of dispensers disposed in a substantially linear relation.*

*49. An apparatus for filling containers according to claim 48, wherein said actuating apparatus for said plurality of dispenses comprises a like plurality of liquid pumps, and said connecting apparatus comprises a plurality of liquid conduits interconnecting each liquid pump with its associated dispenser.*

*50. An apparatus for filling containers in a substantially sterile environment, the apparatus comprising:*

*a frame;*

*an upright wall carried by said frame and dividing the apparatus into a substantially contamination free sterile zone and a non-sterile zone at least partially disposed in side-by-side relation;*

*an enclosure cooperating with said upright wall to define said sterile zone;*

*a transfer apparatus that receives empty containers from a point outside said sterile zone;*

*a plurality of operating stations each including operating apparatus disposed in sequential relation within said sterile zone, a given operation being performed with respect to the containers at each operating station by the associated operating apparatus;*

*a transport at least partially disposed within said sterile zone that moves the containers through said plurality of operating stations;*

*said plurality of operating stations comprising:*

*a filling station that fills the containers with pharmaceuticals as they are moved through said sterile zone by said transport;*

*a closing station that places a closure member on each container after it has been filled and as it is moved through said sterile zone by said transport;*

*a plurality of actuating apparatus in operable communication with said plurality of operating stations, each of said actuating apparatus being disposed within said non-sterile zone; and*

*a plurality of connecting apparatus between each of said actuating apparatus and its associated operating station, each of said connecting apparatus extending through a sealed opening in said upright wall.*

*51. An apparatus for filling containers according to claim 50, wherein said enclosure comprises a bottom wall and a drain disposed within said bottom wall.*

*52. An apparatus for filling containers according to claim 50, wherein said upright wall comprises a substantially vertical wall member.*

*53. An apparatus for filling containers according to claim 52, wherein said substantially vertical wall member and said enclosure comprise stainless steel.*

*54. An apparatus for filling containers according to claim 50, wherein said transport comprises:*

*first and second drive wheels disposed in opposed relation, each of said drive wheels being disposed for rotation about a substantially horizontal axis;*

*an endless conveyor belt encircling said first and second drive wheels and defining upper and lower flights; and*

*a plurality of container carrying members secured to said endless conveyor belt in spaced relation.*

*55. An apparatus for filling containers according to claim 54, wherein each of said container carrying members is disposed in overlying relation to the outer face of said endless conveyor belt.*

*56. An apparatus for filling containers according to claim 55, wherein the width of each container carrying member substantially corresponds to the width of said endless conveyor belt.*

*57. An apparatus for filling containers according to claim 55, wherein each of said container carrying members defines a platform sized and configured to receive and supportably carry one of said containers.*

*58. An apparatus for filling containers according to claim 57, wherein each of said container carrying members further comprises a V-shaped laterally opening recess disposed over said platform for providing lateral support to containers of differing size.*

*59. An apparatus for filling containers according to claim 50, wherein said filling station comprises a plurality of dispensers disposed in a substantially linear relation.*

*60. An apparatus for filling containers according to claim 59, wherein said actuating apparatus for said plurality of dispensers comprises a like plurality of liquid pumps, and said connecting apparatus comprises a plurality of liquid conduits interconnecting each liquid pump with its associated dispenser.*

*61. An apparatus for filling containers in a substantially sterile environment, the apparatus comprising:*

*an upright wall dividing the apparatus into a substantially contamination free sterile zone and a non-sterile zone, said zones at least partially disposed in side-by-side relation;*

*an enclosure cooperating with said upright wall to define said sterile zone;*

*a transfer apparatus that receives empty containers from a point outside said sterile zone;*

*a transport at least partially disposed within said sterile zone that moves the containers through said sterile zone; and*

*a filling apparatus that fills the containers with pharmaceuticals in said sterile zone as the containers are moved through said sterile zone, said filling apparatus comprising at least one dispenser disposed within said sterile zone and comprising a portion disposed in said non-sterile zone;*

*said filling apparatus extending through a sealed opening in said upright wall generally between said filling apparatus dispenser in said sterile zone and said filling apparatus portion in said non-sterile zone.*

*62. An apparatus for filling containers according to claim 61, the apparatus further comprising:*

*a transport that moves the containers through said sterile zone.*

*63. An apparatus for filling containers according to claim 61, the apparatus further comprising:*

*a frame that supports said upright wall and said enclosure.*

*64. An apparatus for filling containers according to claim 61, the apparatus further comprising:*

*actuating apparatus in operable communication with said filling apparatus dispenser, said actuating apparatus disposed within said non-sterile zone.*

*65. An apparatus for filling containers according to claim 64, the apparatus further comprising:*

*connecting apparatus between said actuating apparatus and said filling apparatus dispenser, said connecting apparatus extending through said sealed opening in said upright wall.*

*66. An apparatus for filling containers according to claim 64, wherein the actuating apparatus comprises a pump.*

*67. An apparatus for filling containers according to claim 61, the apparatus further comprising:*

*a plurality of operating apparatus, including said filling apparatus, disposed in sequential relation, each of said operating apparatus comprising at least a first portion disposed within said sterile zone and a second portion disposed within said non-sterile zone, a given operation being performed with respect to the containers at each of said operating apparatus; and*

*each of said operating apparatus extending through said sealed opening in said upright wall generally between said first portion in said sterile zone and said second portion in said non-sterile zone.*

*68. An apparatus for filling containers according to claim 67, wherein said plurality of operating apparatus comprises a closure apparatus.*

*69. An apparatus for filling containers according to claim 61, wherein said enclosure comprises a bottom wall and a drain disposed within said bottom wall.*

*70. An apparatus for filling containers according to claim 61, wherein said upright wall comprises a substantially vertical wall member.*

*71. An apparatus for filling pharmaceutical containers in a substantially sterile environment, the apparatus comprising:*

*an upright wall dividing the apparatus into a substantially contamination free sterile zone and a non-sterile zone, said zones being at least partially disposed in side-by-side relation;*

*an enclosure cooperating with said upright wall to define said sterile zone;*

*a transfer apparatus that receives empty pharmaceutical containers from a point outside said sterile zone;*

*a plurality of operating apparatus disposed in sequential relation, each of said operating apparatus comprising at least a first portion disposed within said sterile zone and a second portion disposed within said non-sterile zone, a given operation being performed with respect to the pharmaceutical containers at each of said operating apparatus; and*

*a transport at least partially disposed within said sterile zone that moves the pharmaceutical containers through said plurality of operating apparatus;*

*each of said operating apparatus extending through a sealed opening in said upright wall generally between said first portion in said sterile zone and said second portion in said non-sterile zone.*

*72. An apparatus for filling containers according to claim 71, the apparatus further comprising:*

*a transport that moves the containers through said sterile zone.*

*73. An apparatus for filling containers according to claim 71, the apparatus further comprising:*

*a frame that supports said upright wall and said enclosure.*

*74. An apparatus for filling containers according to claim 71, the apparatus further comprising:*

*a plurality of actuating apparatus in operable communication with corresponding first portions of said plurality of operating apparatus, said actuating apparatus disposed within said non-sterile zone.*

*75. An apparatus for filling containers according to claim 74, the apparatus further comprising:*

*a plurality of connecting apparatus between each of said plurality of actuating apparatus and said corresponding first portions of said plurality of operating apparatus, said connecting apparatus extending through said sealed opening in said upright wall.*

*76. An apparatus for filling containers according to claim 74, wherein one of said plurality of actuating apparatus comprises a pump.*

*77. An apparatus for filling containers according to claim 71, wherein said plurality of operating apparatus comprises a filling apparatus and a closure apparatus.*

*78. An apparatus for filling containers according to claim 71, wherein said enclosure comprises a bottom wall and a drain disposed within said bottom wall.*

*79. An apparatus for filling containers according to claim 71, wherein said upright wall comprises a substantially vertical wall member.*

*80. An apparatus according to claim 71 further comprising:*

*sealed access for intervention during operation of the apparatus from outside said sterile zone into said sterile zone.*

*81. An apparatus according to claim 80 wherein sealed access includes glove ports.*

*82. Apparatus for filling containers in a substantially sterile environment, comprising:*

*an elongated frame;*

*an upright wall carried by the frame and extending over a substantial portion of its length the upright wall dividing the apparatus into an elongated substantially contamination free sterile zone and an elongated non-sterile zone disposed in adjacent relation;*

*an elongated enclosure carried by the elongated frame and cooperating with the upright wall to define the elongated sterile zone;*

*a plurality of operating stations each including operating apparatus disposed in substantially linear relation within the elongated sterile zone, a given operation being performed with respect to the containers at each operating station by the associated operating apparatus;*

*a transport disposed within the elongated sterile zone for transporting containers through the plurality of operating stations;*

*the plurality of operating apparatus comprising:*

*a first container transfer device that transfers empty containers from a point outside the elongated sterile zone to the transport;*

*a pharmaceutical container filling apparatus;*

*a closing apparatus that closes the filled containers; and*

*a second container transfer device that transfers filled containers from the transport to a point outside the elongated sterile zone;*

*actuating apparatus for the transport means and for each of the operating apparatus, each of the actuating apparatus being disposed within the non-sterile zone; and*

*connection apparatus that operatively connect each of the actuating apparatus with its associated operating apparatus, each of the connection apparatus extending through a sealed opening in the upright wall.*

*83. The apparatus defined by claim 82, wherein the enclosure comprises a bottom wall and a drain disposed within the bottom wall.*

*84. The apparatus defined by claim 82, wherein the upright wall comprises a substantially vertical wall member.*

*85. The apparatus defined by claim 84, wherein the substantially vertical wall member and the enclosure comprise stainless steel.*

*86. The apparatus defined by claim 82, wherein the filling apparatus comprises a plurality of nozzles disposed in the substantially linear relation.*

*87. The apparatus defined by claim 86, wherein the actuating apparatus for the plurality of nozzles comprises a like plurality of liquid pumping devices, and the connecting apparatus therefore comprises a plurality of liquid conduits interconnecting each pumping device with its associated nozzle.*

*88. The apparatus defined by claim 82, wherein the plurality of operating apparatus further comprises:*

*a pre-fill check weigh apparatus to determine the weight of a selected container prior to filling; and*

*a post-fill check weigh apparatus to determine the weight of the selected container after filling.*

* * * * *

UNITED STATES PATENT AND TRADEMARK OFFICE

CERTIFICATE OF CORRECTION

PATENT NO. : RE 37,471 E
DATED : December 18, 2001
INVENTOR(S) : Jagger, Theodore It is certified that error appears in the above-identified patent and that said Letters Patent is hereby corrected as shown below:

Column 1,
Line 9, before "BACKGROUND OF THE INVENTION", add the following:
-- Application No. 09/414,913, filed October 7, 1999, now U.S. Patent RE 37,471, and application No. 10/023,394, filed December 17, 2001, are copending applications which are each reissues of application no. 08/777,992, filed January 2, 1997, now U.S. Patent No. 5,673,535. --

Signed and Sealed this

Eighth Day of February, 2005

JON W. DUDAS
*Director of the United States Patent and Trademark Office*